Figure 1:
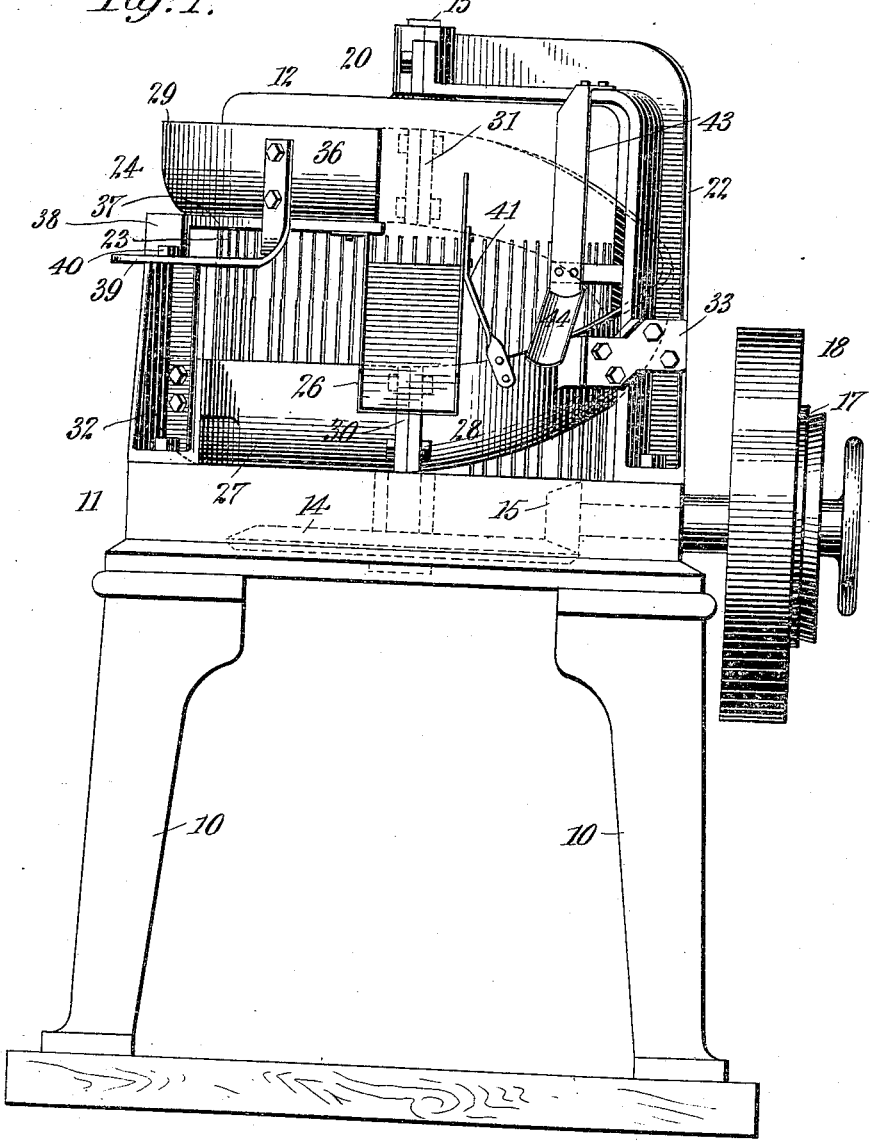

E. T. PARSONS.
MACHINE FOR TREATING DOUGH AND THE LIKE.
APPLICATION FILED MAR. 31, 1909.

990,383.

Patented Apr. 25, 1911.

3 SHEETS—SHEET 1.

Witnesses:
Frank S. Ober
Arthur Marion.

Inventor
Edward T. Parsons,
By his Attorney
Chas. E. Gill

E. T. PARSONS.
MACHINE FOR TREATING DOUGH AND THE LIKE.
APPLICATION FILED MAR. 31, 1909.
990,383.
Patented Apr. 25, 1911.
3 SHEETS—SHEET 2.
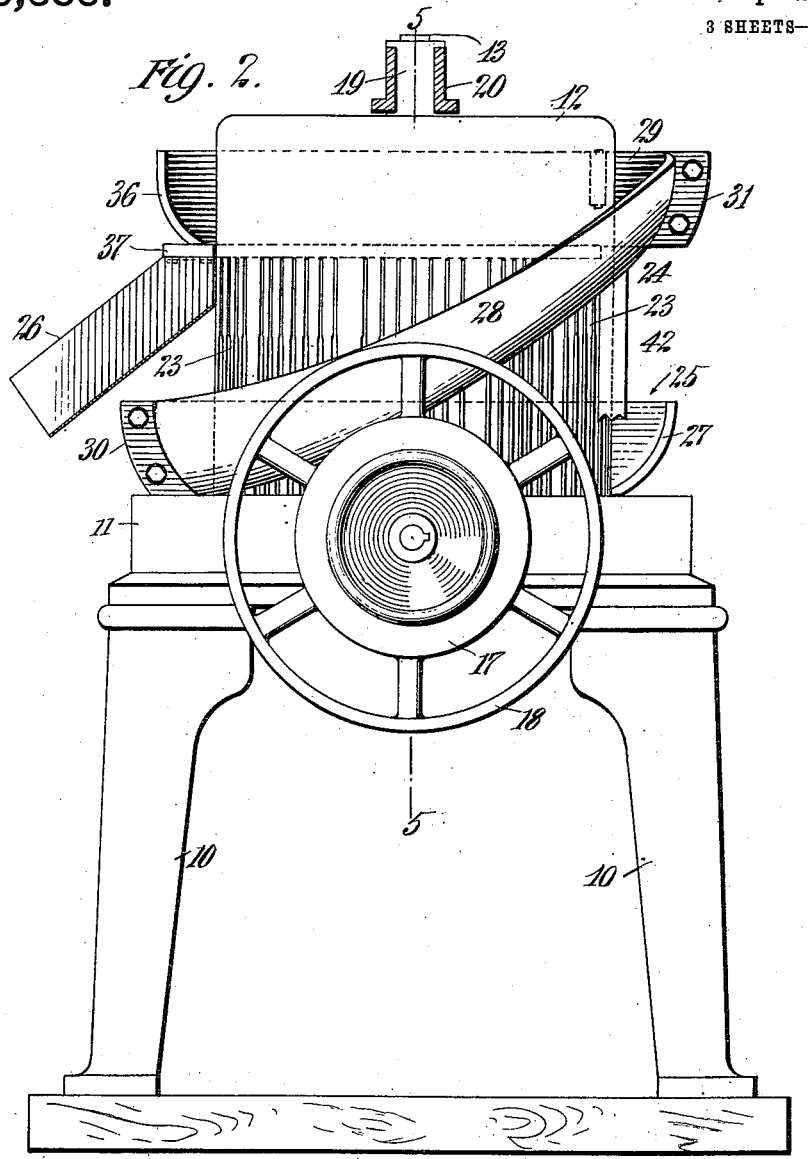
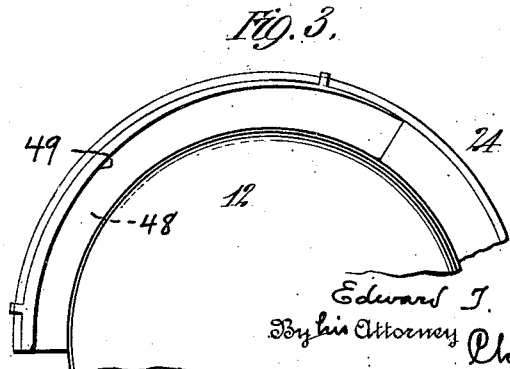

E. T. PARSONS.
MACHINE FOR TREATING DOUGH AND THE LIKE.
APPLICATION FILED MAR. 31, 1909.

990,383.

Patented Apr. 25, 1911.

3 SHEETS—SHEET 3.

Witnesses:

Inventor
Edward T. Parsons,
By his Attorney

UNITED STATES PATENT OFFICE.

EDWARD T. PARSONS, OF NEWARK, NEW JERSEY.

MACHINE FOR TREATING DOUGH AND THE LIKE.

990,383. Specification of Letters Patent. Patented Apr. 25, 1911.

Application filed March 31, 1909. Serial No. 487,018.

*To all whom it may concern:*

Be it known that I, EDWARD T. PARSONS, a citizen of the United States, and a resident of Newark, in the county of Essex and State of New Jersey, have invented certain new and useful Improvements in Machines for Treating Dough and the Like, of which the following is a specification.

The invention relates to improvements in machines for treating dough, and it consists in the novel features, structure and combinations of parts hereinafter described, and particularly pointed out in the claims.

The object of the invention is the production of a highly efficient machine for molding pieces or lumps of dough and imparting to the lumps so molded or treated all of the beneficial characteristics sought to be attained by customary hand-molding processes.

The machine of my invention comprises, in its preferred form, a vertical rotary drum and a stationary trough encompassing the same along which by their contact with the rotating drum the lumps of dough are caused to travel, said trough preferably comprising three sections, one being horizontal and extending about one-half way around the lower end of said drum, another being horizontal and extending about one-half way around the upper end of said drum, and the third being inclined and extending around one-half of said drum from the end of the lower trough-section to the beginning of the upper trough-section. At the terminus of the upper trough-section is provided a discharge chute for the molded lumps of dough, and preferably the upper trough-section is formed with a hinged portion so that the trough at its delivery section may be adjusted toward and from the drum as occasion may require. I also provide the machine with scraper-blades for cleaning the sides of the drum and with deflecting blades engaging the top of the drum for directing flour placed on said top to the edges of the drum whence it may fall into the trough for flour-dusting the same.

The special formation of trough herein presented has been designed to secure the highest efficiency in dough-molding processes, and preferably the drum will have vertical grooves formed in its side to create a surface adapted to engage and move the lumps of dough along said trough and at the same time act on the skin of the lumps in a beneficial manner.

Figure 4:
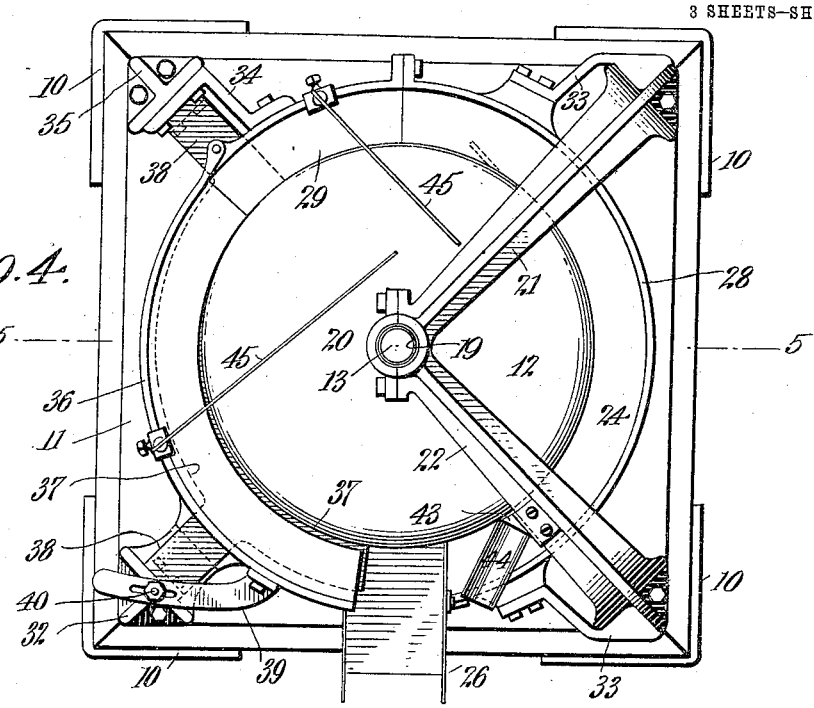
Figure 5:
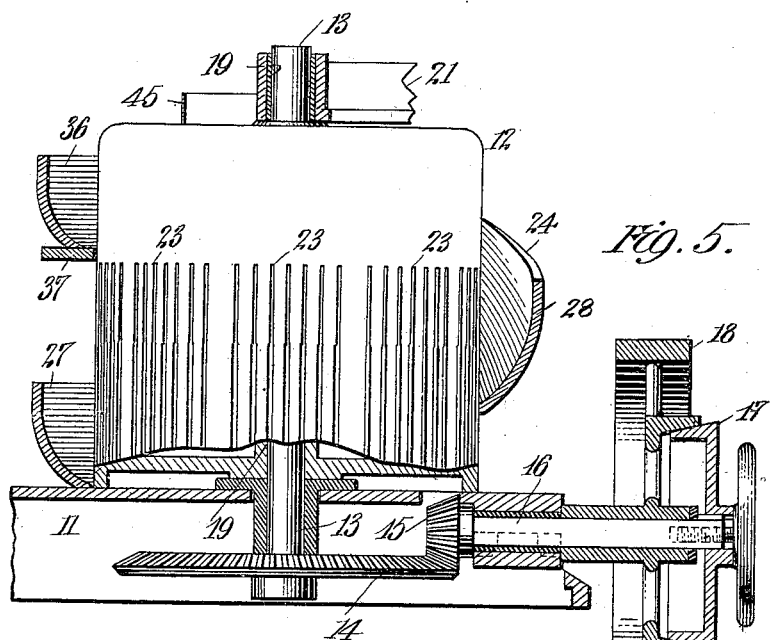

The invention will be fully understood from the detailed description hereinafter presented, reference being had to the accompanying drawings, in which:

Figure 1 is a rear elevation of a machine constructed in accordance with and embodying my invention; Fig. 2 is a side elevation, partly broken away, of the same taken from the right hand side of Fig. 1; Fig. 3 is a detached top view of a portion of the same and shows a modification; Fig. 4 is a top view of the complete machine less the driving mechanism, and Fig. 5 is a central vertical section through a portion of the same on the dotted lines 5—5 of Figs. 2 and 4.

In the drawings 10 designates suitable supporting legs for the bed-plate 11 which may be of any suitable outline and supports the operative parts of the machine.

Mounted centrally upon the bed-plate 11 is a vertical rotary drum or cylinder 12, which is secured on a vertical shaft 13 to be driven by any suitable means. I illustrate the shaft 13 as having secured on its lower end a beveled gear wheel 14 in mesh with a beveled pinion wheel 15 secured on the driving shaft 16, which is equipped with a suitable clutch member 17 and normally loose belt wheel 18, but I do not limit the invention to any special driving and clutch mechanisms. The shaft 13 extends upwardly through a central hub portion 19 of the drum 12 and the upper end of said shaft and hub portion are held in a bearing 20 at the upper inner converging ends of arms 21, 22 which are preferably in the form of a casting and secured at their lower ends to the bed plate 11. The drum 12 has a flat top, rounded upper edges and vertical sides which are plain with the exception of being formed with vertical grooves 23 which are somewhat wider at their lower than at their upper portions and do not extend to the upper end of the drum. The purpose of the grooves 23 is to create a surface on the drum capable of engaging the pieces of dough and facilitating their treatment and movement along the path intended for them.

The drum 12 is encompassed by a trough 24 through which the pieces of dough are caused, by the rotation of the drum, to roll and travel from the point of entrance 25 therefor (Fig. 2) to the delivery chute 26 at the upper terminus of the trough. The trough 24 is of special shape in cross-section, said trough curving downwardly and inwardly on a steep slope or declivity to the side of the drum 12, as more clearly shown in Figs. 2 and 5. I regard the shape of the trough 24 as of special importance in the attainment of the result sought. The trough 24 is vertical, it has an open top and is closed at its inner side by the side of the drum 12, and as aforesaid said trough curves downwardly and inwardly to the side of said drum, whereby the trough is very narrow at its bottom and increases in width from its bottom upwardly. The trough 24 may be considered as formed of three sections 27, 28, 29, the section 27 being horizontal and at the lower end of the drum 12, the section 29 being horizontal and at the upper end of the drum and the section 28 being inclined and extending upwardly around the drum from the lower section 27 to the upper section 29. The lower section 27 and the lower end of the section 28 are flanged and secured together, as at 30, and the adjoining ends of the sections 28, 29 are similarly flanged and secured together, as at 31. The lower trough-section 27 is secured to a standard 32 which is bolted to the bed-plate 11; the section 28 is secured to brackets 33 which are bolted to the vertical portions of the arms 21, 22, and the section 29 is secured by a bracket 34 to a standard 35 bolted to the bed-plate. I preferably, though not necessarily, form the upper trough-section 29 with a hinged portion 36 so that at the delivery part of the trough the latter may be widened on gradual lines if desired. The hinged portion 36 of the trough will be supported on a flooring 37, which is stationary and closely encompasses the drum 12 below said hinged portion 36 so as to prevent the creation of an open space below said hinged portion 36 when the latter is turned outwardly from the drum, said flooring when the portion 36 is turned outwardly constituting a part of the bottom of the trough, as shown in Figs. 4 and 5. The flooring 37 may be conveniently secured in position by arms 38 extending therefrom (Fig. 4) and fastened to the standards 32, 35. The means for enabling the adjustment of the hinged portion 36 of the trough and its being secured in its adjusted positions comprise a bar 39 secured to said portion 36 and bent to extend over the standard 32 and a bolt 40 passing through an elongated slot in said bar and entering said standard. The delivery chute 26 may be secured in position by an arm 41 secured to the trough and to one side of the chute and by the other side of said chute being fastened to the flooring 27, as indicated in Fig. 1.

I equip the machine with scrapers 42, 43 for the side of the drum 12, these scrapers being strips of sheet metal having an edge held against said drum and provided to keep the drum reasonably free from accumulations of flour and dough. The scraper 42 will engage the side of the drum 12 in advance of the lower end or beginning (25) of the trough, and the scraper 43 will engage the upper portion of the side of the drum as the same passes beyond the delivery chute 26. The matter removed by the scraper 43 will descend upon a chute 44 which will conduct the same laterally over the trough, as shown in Figs. 1 and 4.

It is desirable that the trough 24 when in use be dusted with flour, and to facilitate this operation I secure to the rim of the upper section of the trough the scraper-blades 45 which extend angularly upon and engage the upper surface of the drum 12. The flour is dusted upon the head or upper end of the drum 12 and as the latter rotates the flour is carried against the scrapers which arrest the same and, due to their position and the motion of the drum, cause the flour to gradually deflect toward and over the edge of the drum, whence it descends into the trough.

The operation of the machine of my invention will be largely understood from the foregoing description and only brief further reference thereto is necessary. The drum 12 is rotated by power and the lumps of dough are fed to the trough 24 at the beginning of its lower section 27 or at the point 25 (Fig. 2). The lumps of dough fed to the trough rest at one side against and are engaged by the drum 12 and are by the latter rolled along the lower section 27 of the trough, then up the section 28 thereof and then along the section 29 to the chute 26, down which they may, one after another, descend. The coarser portions of the grooves 23 of the drum 12 engage the lumps of dough while said lumps are in the lower section 27 of the trough and in the lower portion of the inclined section 28 thereof, and the finer portions of said grooves engage said lumps during their travel along the upper portion of the trough section 28. The drum 12 presents smooth surfaces to the lumps of dough during the travel of the latter along the upper trough-section 29. The trough 24 is entirely open at its upper side and curves downwardly and inwardly to the side of the drum 12, which closes the inner vertical side of the trough. The trough 24 composed of the three sections or divisions hereinbefore referred to I have found to be specially beneficial in the correct molding and treatment of the dough. The hinged portion 36 of the upper trough-section may be turned outwardly from or inwardly toward the drum 12 according to the effect it may be desired to create with respect to the dough. If freedom from pressure on the dough is desired the portion 36 will be turned outwardly, otherwise it will be set inwardly.

The modification shown in Fig. 3 consists in providing a detachable trough-section 48 having a side wall 49 which gradually thickens toward the outlet end of the trough, the said section 48 being intended to be set into the trough 24 at its exit portion when it may be desired to gradually restrict the passage through the trough and thereby increase the pressure on the lumps of dough passing to the chute 26. The trough-section 48 is a reducing member and it will be used or not as the occasion may require, either with the trough having a hinged portion 36 or with the trough if made rigid and uniform throughout or not provided with said hinged portion. The trough-section 48 affords means for varying the dimensions of the upper section of the main trough 24.

What I claim as my invention and desire to secure by Letters-Patent, is:

1. In a machine for treating dough and the like, a vertical drum, means for rotating the same, and a trough encompassing said drum and comprising a lower section extending along the lower part of said drum, an upper section extending along the upper part of said drum and an inclined section extending from said lower to said upper section, the side of said drum closing the inner side of said trough, and a concentric portion of said trough being hinged and adjustable with relation to said drum; substantially as set forth.

2. In a machine for treating dough and the like, a vertical cylinder, means for rotating the same, and an open-top exposed trough 24 encompassing said cylinder and in cross-section curving downwardly and laterally on a steep slope to the side thereof, whereby the side of the cylinder closes one side of the trough and the trough is of gradually decreasing cross-sectional area toward its lower portion with said portion of materially less diameter than the general diameter of the piece of dough to travel along the trough, said trough comprising a lower section extending along the lower part of said cylinder, an upper section extending along the upper part of said cylinder and an inclined section extending from said lower to said upper section, and said upper and lower sections of said trough being substantially horizontal and each encompassing about one-half of the circumference of said cylinder; substantially as set forth.

3. In a machine for treating dough and the like, a vertical drum, means for rotating the same, and a trough encompassing said drum and comprising a lower section extending along the lower part of said drum, an upper section extending along the upper part of said drum and an inclined section extending from said lower to said upper section, the side of said drum closing the inner side of said trough, and a concentric portion of said trough being hinged and adjustable with relation to said drum and having a stationary flooring closely encompassing the side of said drum to close the space which would otherwise be left when said portion is moved outwardly from said drum; substantially as set forth.

4. In a machine for treating dough and the like, a vertical drum, means for rotating the same, and a trough encompassing said drum and extending from the lower to the upper portion of the same, combined with deflecting scraper blades engaging the top of said drum for directing flour placed on said drum to the edges thereof, whence it may descend into said trough, the side of said drum closing the inner side of said trough; substantially as set forth.

5. In a machine for treating dough and the like, a vertical drum, means for rotating the same, and a trough encompassing said drum and extending from the lower to the upper portion of the same, combined with deflecting scraper blades engaging the top of said drum for directing flour placed on said drum to the edges thereof, whence it may descend into said trough, and scraper-blades for cleaning the side of said drum, the side of said drum closing the inner side of said trough; substantially as set forth.

6. In a machine for treating dough and the like, a vertical cylinder, means for rotating the same, and an open-top exposed trough 24 encompassing said cylinder and in cross-section curving downwardly and laterally on a steep slope to the side thereof, whereby the side of the cylinder closes one side of the trough and the trough is of gradually decreasing cross-sectional area toward its lower portion with said portion of materially less diameter than the general diameter of the piece of dough to travel along the trough, said trough comprising a lower section extending along the lower part of said cylinder, an upper section extending along the upper part of said cylinder and an inclined section extending from said lower to said upper section, and said upper and lower sections of said trough being substantially horizontal one below the other and each encompassing about one-half of the circumference of said cylinder, while said inclined section encompasses the other half of said cylinder, combined with a downwardly inclined discharge chute 26 at the terminus of the upper end of said trough; substantially as set forth.

7. In a machine for treating dough and the like, a drum, means for rotating the same, and a trough encompassing said drum, combined with means for varying the size of a portion of said trough; substantially as set forth.

8. In a machine for treating dough and the like, a vertical cylinder, means for rotating the same, and an exposed open-top trough 24 encompassing said cylinder and in cross-section extending downwardly and laterally on a steep slope to the side thereof, whereby the side of the cylinder closes one side of the trough and the trough is of gradually decreasing cross-sectional area toward its bottom portion with said portion of materially less diameter than the general diameter of the piece of dough to travel along the trough, said trough being adapted to receive the dough at its lower end and release the same at its upper end and being extended upwardly spirally along the vertical surface of said cylinder, whereby on the rotation of said cylinder the piece of dough is caused to travel upwardly along the trough and around said cylinder with the confinement and weight of the dough causing the piece thereof to settle closely in said trough and against said cylinder; substantially as set forth.

Signed at New York city, in the county of New York and State of New York, this 30th day of March, A. D. 1908.

EDWARD T. PARSONS.

Witnesses:
ARTHUR MARION,
CHAS. C. GILL.

---

Copies of this patent may be obtained for five cents each, by addressing the "Commissioner of Patents, Washington, D. C."